Figure 1:
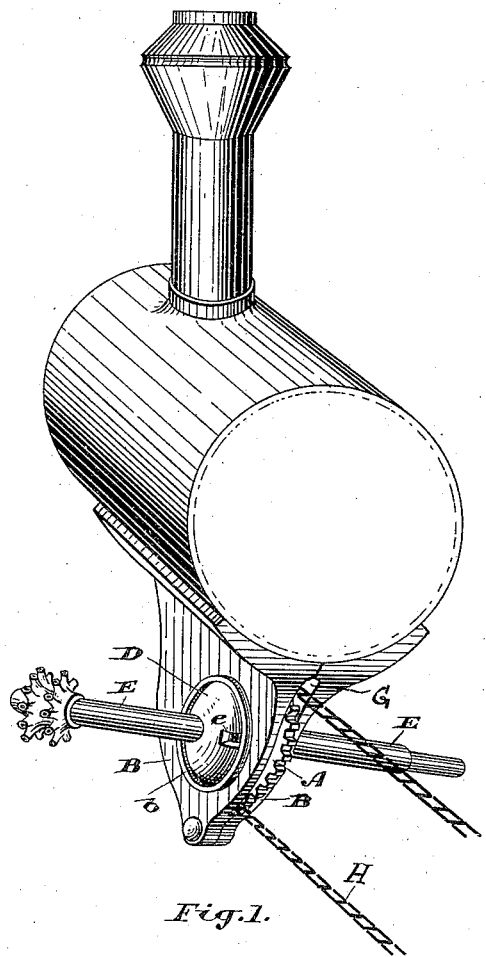

(No Model.)  2 Sheets—Sheet 1.

J. LEIGH.
TRACTION ENGINE.

No. 343,910. Patented June 15, 1886.

Witnesses.
J. B. Fetherstonhaugh
Jas. E. Maybee

Inventor.
James Leigh
by Donald C. Ridout & Co
Attys (No Model.)  2 Sheets—Sheet 2.
J. LEIGH.
TRACTION ENGINE.
No. 343,910.  Patented June 15, 1886.
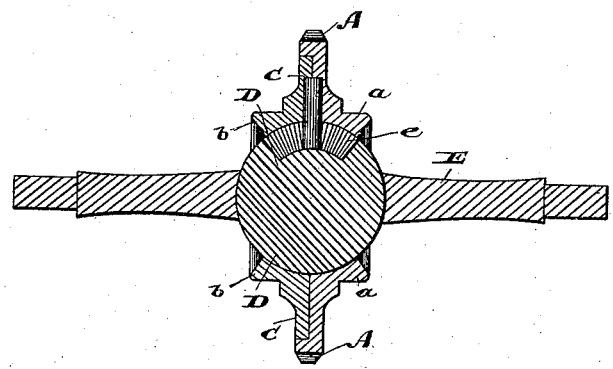
Fig. 2.
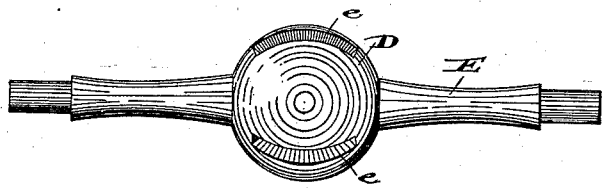
Fig. 3.
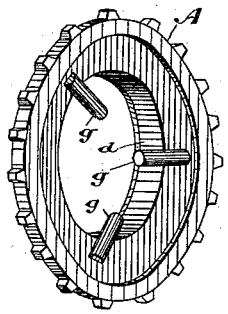  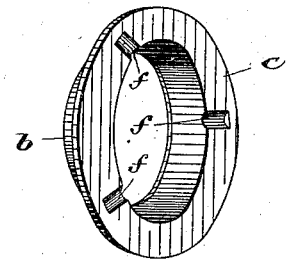
Fig. 4.  Fig. 5.
Witnesses.  Inventor.
F. B. Fetherstonhaugh  James Leigh
Jas. P. Maybee  by Donald C. Ridout & Co
  Attys

UNITED STATES PATENT OFFICE.

JAMES LEIGH, OF ORONO, ONTARIO, CANADA.

TRACTION-ENGINE.

SPECIFICATION forming part of Letters Patent No. 343,910, dated June 15, 1886.

Application filed October 19, 1885. Serial No. 180,246. (No model.)

*To all whom it may concern:*

Be it known that I, JAMES LEIGH, of the village of Orono, in the county of Durham, in the Province of Ontario, Canada, manufacturer, have invented certain new and useful Improvements in Traction-Engines, of which the following is a specification.

This invention relates to certain new and useful improvements in traction-engines; and it consists in the peculiar combinations and the novel construction and arrangement of parts, all as more fully hereinafter described and claimed.

Figure 1 is a perspective view showing an axle connected to the body of a traction-engine in accordance with my invention. Fig. 2 is a sectional view of the axle and ball formed upon or attached to it. Fig. 3 is a view of axle and ball. Figs. 4 and 5 are perspective details of the gear, showing the cup within which the ball on the axle is fitted.

All mechanics who are familiar with traction-engines know that those commonly in use derive traction from only one pair of wheels, and as a consequence a large portion of the weight of the engine is supported upon a pair of dead-wheels, which must be pushed by the traction-wheels.

By the adoption of my invention I am enabled to convey the motion to all the ground-wheel axles, no matter how many are employed, without in any way impairing their usefulness for steering or other purposes, and consequently the full weight of the traction-engine is utilized for traction-power.

For the purpose of illustrating my invention I have chosen to show a simple sprocket-wheel, A, although it will be understood by those skilled in the trade that any kind of wheel—such as a spur-wheel, friction-wheel, &c.—might be substituted with equal advantage. This sprocket-wheel A has a large hub, $a$, which fits into a journal-box formed in the sides of the bracket B. This bracket is secured to the boiler in any suitable manner. This bracket is made in two like parts, the inner adjacent faces of which are cut away to form a passage-way, G, for the cable H, and a recess for the wheel A. By this construction the wheel and operating parts are incased and protected by the bracket. A detachable plate, C, fits into a recess formed in the sprocket-wheel A, and has a hub, $b$, formed on it to fit into a journal made in the opposite half of the bracket B. A cup, $d$, is formed on the inside of the sprocket-wheel A and plate C, which cup corresponds with the shape of the ball D, formed upon or attached to the axle E. The cup $d$ is made a neat fit for the ball D, so that the latter may rock and swivel easily within it. One or more slots, $e$, are made in the ball D, and corresponding slots, $f$, in the cup $d$, so as to receive pins $g$, which constitute a connection between the ball D and sprocket-wheel A, so that the revolving motion of the latter shall be conveyed to the axle E, while at the same time the said axle is allowed to swivel freely. From this description it will be seen that the sprocket-wheel A, which is journaled in the bracket B, may be caused to revolve freely within the said bracket, which bracket is rigidly fastened to the frame or body of the engine, and therefore, as the motor employed for imparting motion to the sprocket-wheel A is also rigidly fastened to the frame or body of the engine, the said sprocket-wheel and the axle from which it derives motion will always be kept in line, while the axle E is permitted to swivel freely, if required to do so, for steering or any other purpose.

I am aware of the Patent No. 223,405, and make no claim to the construction shown therein as forming part of my invention.

What I claim as my invention is—

1. The combination, with the axle E, provided with the ball D, having slots $e$, of the sprocket-wheel A, detachable plate C, having hub $b$ and slots $f$ formed in said wheel and plate, and the pins $g$, engaging said slots, substantially as and for the purpose specified.

2. In a traction-engine, the combination, with the bracket B, of the sprocket-wheel A, having hub $a$, having bearing in said bracket, the detachable plate C, having hub $b$, having a bearing in said bracket, the axle E, provided with ball D, formed with slots $e$, cup $d$, formed on the inside of said wheel and plate and adapted to receive the ball D, said cup provided with slots $f$, and the pins $g$, engaging said slots, substantially as and for the purpose specified.

3. The combination, with the axle E, formed with ball D, and sprocket-wheel A, formed with socket to receive said ball, of the two-part bracket B, recessed to receive said wheel, and forming a support and as a protection or casing for said wheel and ball-and-socket connection, as set forth.

Toronto, September 12, 1885.

JAMES LEIGH.

In presence of:—
 CHAS. C. BALDWIN,
 BYRON LEIGH.